Jan. 21, 1969
E. W. PEARSON
3,422,727
TWO SPEED RAM TYPE MACHINE
Filed Aug. 4, 1967
Sheet 1 of 2
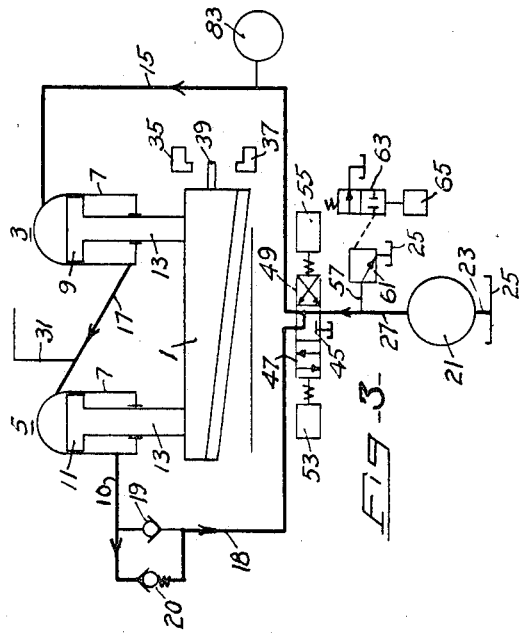
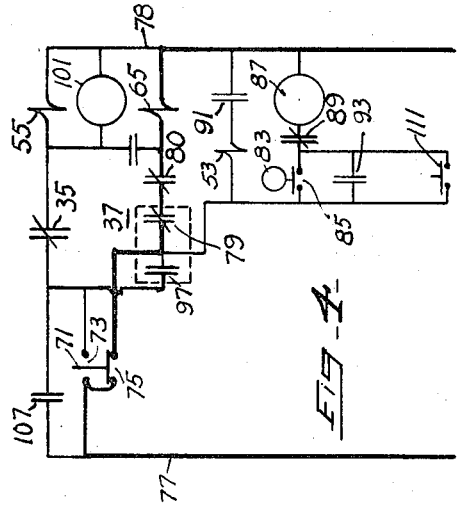
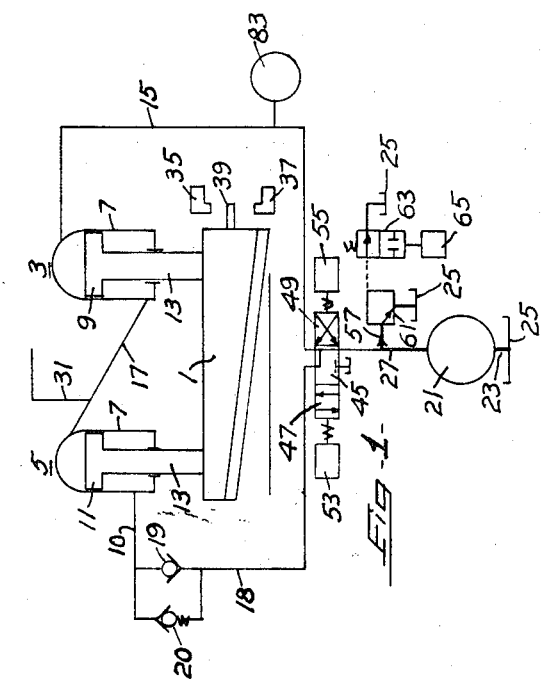
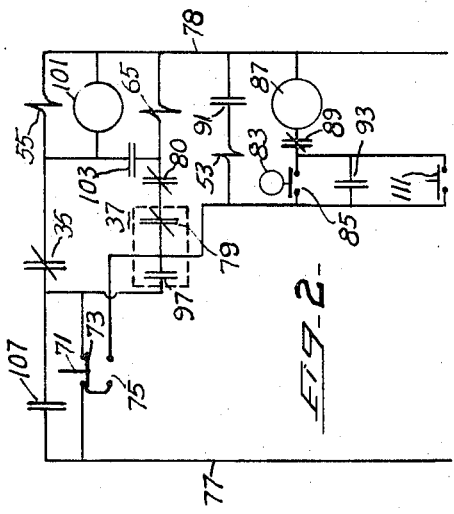
INVENTOR.
EUGENE W. PEARSON
BY
Edward Brosler
His Attorney

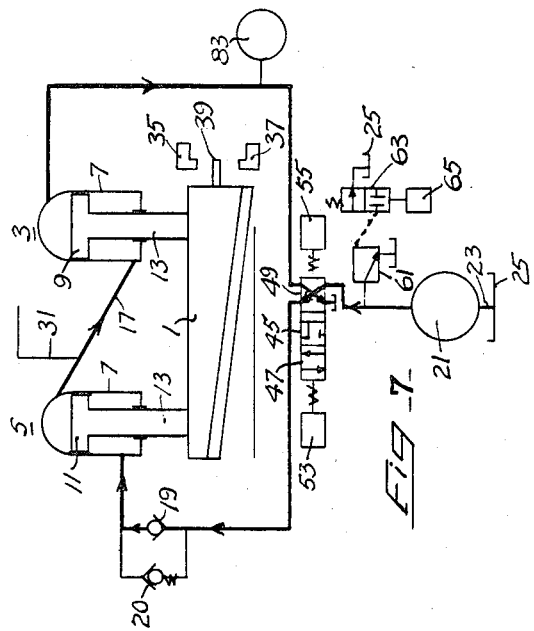
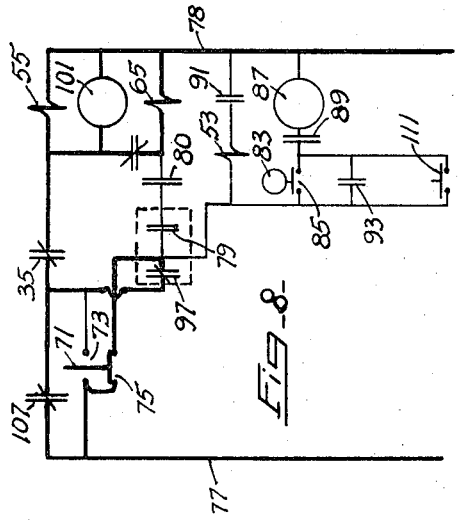
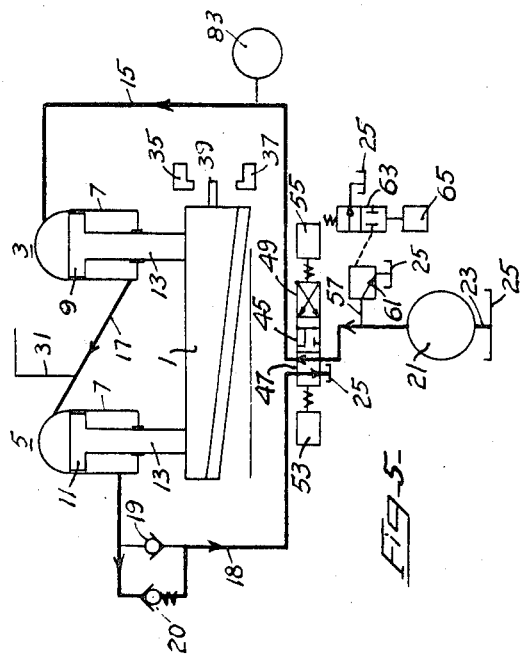
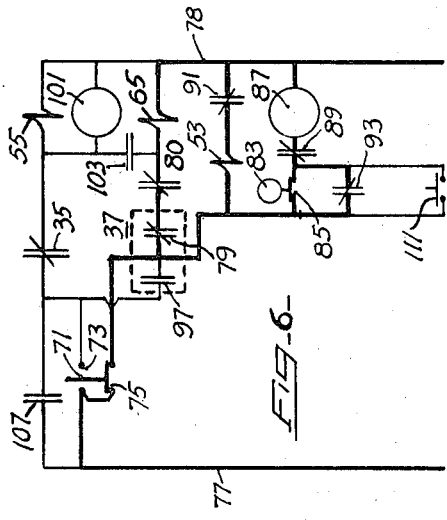
INVENTOR.
EUGENE W. PEARSON
BY
*Edward Brosier*
His Attorney United States Patent Office
3,422,727
Patented Jan. 21, 1969

3,422,727
TWO SPEED RAM TYPE MACHINE
Eugene W. Pearson, Orinda, Calif., assignor to Pacific Press & Shear Corp., a corporation of Illinois
Filed Aug. 4, 1967, Ser. No. 658,412
U.S. Cl. 91—413     5 Claims
Int. Cl. F15b 11/22

ABSTRACT OF THE DISCLOSURE

A hydraulically powered ram type machine employing series connected hydraulic drive motors, simultaneously supplies hydraulic power directly to both motors for fast work stroke of the ram on light loads, and in response to development of a heavy load, the conventional series feed of power to the hydraulic motors is established and maintained during the remainder of the work stroke.

---

My invention relates to ram type machines and, more particularly, to the control of movement of the ram, and will be described in connection with the application of the invention to a shear machine adapted for shearing of heavy steel plate.

Shear machines designed for the shearing of heavy steel plate, for example, have a certain power rating which, in effect, determines the speed of advance of the ram during a work stroke. Such machines can be utilized in shearing sheet metal of less thickness than that representing rated loads for a particular metal or alloy, but the power capability of the machine will not be efficiently utilized, because at such lighter loads, the machine would have sufficient reserve power to handle a more rapid advance of the ram and thereby increase productivity of the machine when handling such loads.

Among the objects of my invention are:
 (1) To provide a novel and improved ram type machine;
 (2) To provide a novel and improved ram type machine in which the rate of movement of the ram during a work stroke may be altered in accordance with the load placed on the ram;
 (3) To provide a novel and improved ram type machine which will efficiently function in operating on lighter than rated loads for which the machine was designed;
 (4) To provide a novel and improved ram type machine which, for light loads, would automatically increase the rate of movement of the ram during a work stroke;
 (5) To provide a novel and improved shear machine;
 (6) To provide a novel and improved shear machine in which, for light shearing loads, the rate of movement of the ram will increase;
 (7) To provide a novel and improved shear machine having rake angle control, in which the rate of movement of the ram may be caused to increase with a reduction in load placed thereon through adjustment of the rake angle of the ram.

Additional objects of my invention will be brought out in the following description of a preferred embodiment of the same as applied to a shear machine, taken in conjunction with the accompanying drawings, wherein FIG. 1 is a schematic view depicting the invention as applied to a shear machine in a condition of operative idleness;

FIG. 2 is a basic circuit diagram associated with the machine of FIG. 1, and depicting the state of the circuitry, with the machine in the condition depicted in FIG. 1;

FIG. 3 is a view corresponding to that of FIG. 1, but depicting the machine in the condition prevailing when operating on light loads;

FIG. 4 is a view corresponding to that of FIG. 2, but depicting the circuitry representative of the operating condition of the machine as depicted in FIG. 3;

FIG. 5 is a view corresponding to FIG. 1, but depicting the machine in the condition prevailing when operated on heavy loads;

FIG. 6 is a view corresponding to that of FIG. 2 but depicting the circuitry corresponding to the condition of the machine as depicted in FIG. 5;

FIG. 7 is a view corresponding to FIG. 1, but depicting the situation prevailing following work stroke and with the hydraulic system adjusted for a return stroke of the ram; and FIG. 8 is a view corresponding to that of FIG. 2, but depicting the circuitry representative of the situation prevailing in the machine of FIG. 7.

In the foregoing figures, no attempt has been made to depict the ram in the particular position it might occupy under the conditions prevailing in the various figures of the drawings.

Referring to the drawings for details of the invention in its preferred form, the invention has been illustrated as applied to a shear machine embodying a ram 1 driven by a pair of hydraulic motors 3 and 5, each involving a cylinder 7, 9 respectively and included pistons 9, 11 respectively. Each piston has a piston rod 13 extending from the cylinder for connection to one end of the ram.

The hydraulic motors are hydraulically connected in series by a flow connection 15 to the upper side of the one piston 9, a flow connection 17 from the under side of said piston to the upper side of the remaining piston 11, and a flow connection 10 from the under side of the piston 11.

In this latter flow connection are parallel connected check valves 19 and 20 of opposite sign, the check valve 20 permitting flow from the underside of the slave piston, being sufficiently spring loaded to support the ram in its uppermost position.

Hydraulic power is derived from a motor-driven pump 21 having a suction line 23 to tank 25 and a discharge line 27 for delivering hydraulic fluid to the hydraulic motors.

When so connected in series, the first piston 9 becomes the master piston, while the remaining piston 11 becomes the slave piston. Conventionally, the under side of the master piston has an area equal to the upper side of the slave piston to assure equal rate of travel of both ends of the ram, all other factors being equal.

Unbalance in the rate of movement of the two pistons may occur due to leakage or difference in temperature conditions associated with the respective motors, and for this reason, a ram type machine may be provided with a levelling or equalizer system, which system may also be modified to permit manual adjustment of the relative rate of feed to the respective hydraulic motors in order to effect a change in rake angle of the ram.

A leveling and rake angle control system applicable to a machine employing series connected hydraulic motors, is disclosed in applicant's Patent No. 3,181,407 for Shear Machine With Adjustable Ram Having Means to Immobilize Said Machine During Adjustment, dated May 4, 1965, and is symbolically illustrated in the drawings of the present application by a flow connection 31 from the flow line 17 intermediate the hydraulic motors.

The stroke of the ram may be controlled by an adjustable upper limit switch 35 and an adjustable lower limit switch 37, each adapted to be engaged by a stop 39 mounted on the ram, all in accordance with the disclosure in my aforementioned patent.

In accordance with the present invention, the flow connection to the upper side of the master piston 9 and the flow connection from the under side of the slave piston 11 are adapted to be selectively and interchangeably connectable to the discharge line 27 of the pump and tank 25 in accordance with a predetermined sequence, and this, in the specific embodiment of the invention illustrated, is accomplished through the intermediary of a multiple valve assembly involving a central section 45 flanked by end sections 47 and 49, the central section serving to connect both flow connections 15 and 19 to the discharge side of the pump, while the one end section 47 connects the discharge side of the pump to the upper side of the master piston 9, and the under side of the slave piston 11 to tank, and the remaining end section 49, when in the system, functioning to reverse such connections between the pump discharge and tank.

From the foregoing, it will be apparent that, with the central section of the valve in functioning position, the pump will supply fluid to the upper side of the master piston, and this will be supplemented by the liquid from the under side of the slave piston, the combined effect of which will be to drive the ram on a work stroke at a relatively high rate of movement.

With the end section 47 of the multiple valve assembly coupled into the hydraulic system, the pump will continue to supply the upper side of the master piston, but the fluid emerging from the under side of the slave piston will no longer supplement the fluid supplied by the pump, but will go directly to tank. Accordingly, the rate of movement of the ram during a work stroke under these conditions, will be materially reduced, and this may be the normal speed for the rated load of the machine.

By coupling the remaining end section 49 of the valve assembly into the hydraulic system to the exclusion of the others, the flow to the series connected hydraulic motors will be reversed, to bring about a return stroke of the ram.

The multiple valve assembly is preferably controlled by a pair of solenoids 53, 55 each adapted to shift the valve assembly in the opposite direction from the other, from a neutral central position when both are unenergized.

With the above described system in operation, and in the absence of other factors, the ram will continue to cycle. To provide for idling of the ram under these conditions, I provide a by-pass flow connection 57 from the discharge side of the pump to tank, through a valve assembly including a normally closed main valve 61 maintained open by a normally open pilot valve 63 having a solenoid 65 for controlling its operation. With the by-pass flow connection open, as indicated in FIG. 1 of the drawings, the ram will be stationary and maintained against dropping from its uppermost position, by the check valve 20 as previously discussed.

When the by-pass flow line is blocked, the situation depicted in FIG. 3 will result, wherein the pump will supply liquid to the upper side of the master piston, and this will be supplemented by the fluid discharging from the under side of the slave piston, to result in a work stroke in which the ram will be moving at a relatively fast rate.

Upon energization of the solenoid 53 associated with the multiple valve assembly, the end section 47 of this valve assembly will be moved into position, causing the discharge from the under side of the slave piston to flow to tank, and thus reduce the rate of movement of the ram during a work stroke. This is the condition depicted in FIG. 5 of the drawings.

Upon energization of the remaining solenoid 55 associated with the multiple valve assembly, the flow to the hydraulic motors will be reversed from that of FIG. 5, thus restoring the ram to its uppermost position, following which, restoration of the by-pass flow connection 57 will bring about the conditions existing in FIG. 1 of the drawings.

In FIGS. 2, 4, 6 and 8 is depicted the circuitry involved in controlling the machine of FIGS. 1, 3, 5 and 7, each circuit corresponding to the status of the valve assemblies in the figure above it.

Referring to FIG. 2 for a description of the pertinent circuitry, the control of the machine is centered in a foot switch 71 adapted to be shifted from an up position, where it spans an upper pair of contacts 73, to a lower position where it spans a pair of contacts 75, corresponding contacts on one side of the switch being connected to one side 77 of power lines 77 and 78.

The solenoid 65 associated with the pilot valve 63, which controls the valve 61 in the by-pass line 57, is connected between the remaining contact of the lower pair and the other line 78 through two pairs of normally closed contacts 79 and 80, the former being included in the lower limit switch 37. Upon depressing the foot switch to bridge the lower contacts 75, this solenoid will be energized and cause operation of the by-pass main valve 61, to block the by-pass passageway, thus resulting in the pump feeding the hydraulic motors through the central section 45 of the multiple valve assembly.

Pressure coupled to the flow connection to the upper side of the master piston, is a pressure switch 83 controlling a pair of contacts 85. These are normally open contacts which are in the circuit of a control relay 87 along with a pair of normally closed contacts 89 and the lower pair of contacts 75 associated with the foot switch. This control relay 87 includes two pairs of normally open contacts 91 and 93, one pair 91 being connected in a circuit for the down solenoid 53 of the multiple valve assembly, which circuit also includes the lower pair of contacts 75 of the foot switch.

Thus, on the fast travel of the ram during a work stroke, should the load increase sufficiently to actuate the pressure switch, the resulting energization of the control relay 87 will result in energizing the down solenoid 53 of the multiple valve assembly. The resulting shift of the multiple valve assembly will establish the hydraulic system for normal rate of travel of the ram.

When this change of speed occurs, it becomes desirable to maintain it for the remainder of the work stroke, and to effect this result, the second pair of normally open contacts 93 of the control relay is connected across the pressure switch contacts, with the result that when the down relay does become energized to produce the normal rate of movement of the ram, the bridging of the pressure switch contacts by the control relay contacts 93, will hold the control relay 87 energized, even should the pressure load in the meantime lighten. This is the condition depicted in the circuit of FIG. 6.

Upon completion of the work stroke, the normally closed contacts 79 of the down limit switch 37 will be opened to de-energize the pilot valve solenoid 65 and thereby reopen the by-pass line 57.

Simultaneously, a normally open pair of contacts 97, also associated with the down limit switch 37 will be closed. These are connected in circuit so that, with the foot switch maintained depressed, a circuit including normally closed contacts of the upper limit switch 35, will be established through the up solenoid 55, to condition the system for a return stroke of the ram.

At the same time, a control relay 101 paralleling the up solenoid, becomes energized. It controls normally closed contacts 89 to de-energize the control relay 87, which in turn will (1) open the circuit to the down solenoid 53, and (2) open its holding circuit contacts 93.

In the absence of other provisions, however, a return stroke would not occur, due to the de-energization of relay 65 and resulting opening of the by-pass line 57, so it becomes necessary to again close this line and thereby supply power to the hydraulic motors.

With this in mind, a normally open pair of contacts 103, associated with the control relay 101, is adapted to connect the pilot valve solenoid 65 back in circuit by the way of the upper limit switch contacts 35, to again cause blocking of the by-pass line, which thus establishes conditions for a return stroke except for the fact that the prompt restoration of the lower limit switch to normalcy, would open the contacts 97, thus opening circuits to the up solenoid 55 and the control relay 101.

To maintain these energized under such circumstances, the control relay 101 is provided with an additional pair of normally open contacts 107, connected across the foot switch in a manner to establish a holding circuit when closed.

The circuit of FIGURE 8, thus represents conditions during a return stroke of the ram, which, when it reaches its upper position and opens the normally closed contacts of the upper limit switch 35, will re-establish the circuit conditions of FIGURE 2, assuming that, in the meantime, the foot switch has been released.

If maintained depressed, the ram will cycle for fast, repeat operations.

A manually controlled switch 111, connected across the pressure responsive switch 83, enables an operator to control operation of the machine at normal speed.

From the invention as thus described, it will become apparent that, upon depressing the foot switch or its equivalent, the ram will approach the work at the increased rate of movement for operation on light loads, but should the load, upon engagement by the ram, fall within the load range for which the machine was designed, the rate of movement of the ram will be materially reduced to enable the same to apply rated power to the work.

Thus, within the lighter load range, the machine will produce at a faster rate, and such rate of production may be further increased by adjusting the stroke limit stops to shorten the stroke, to conform to the lightness of the material to be operated on.

When the machine is a shear, provided with rake angle control, additional flexibility and economies may be realized through adjustment of the rake angle to conform to the character and thickness of the material to be sheared.

From the foregoing, it will be apparent that the objects of the present invention have been realized, and while I have illustrated and described my invention as applied to a shear machine, and in considerable detail, it will be apparent that the invention is not limited to shear machines, and is further subject to alteration and modification without departing from the underlying principles

I claim:

1. A machine of the type employing a reciprocable ram to perform an operation on work, said machine comprising a pair of hydraulic motors, each coupled to a different end of said ram to power the same, each of said hydraulic motors including a cylinder and included reciprocable piston, with a piston rod extending from said cylinder, a hydraulic power system including pump means and said hydraulic motors, a flow connection to the upper side of the one piston, a flow connection from the under-side of said one piston to the upper-side of the other piston, and a flow connection from the under-side of said other piston, to connect said hydraulic motors in series, whereby said one piston becomes a master piston and said other piston, a slave piston, means for flow connecting the discharge side of said pump means simultaneously to both, said flow connection to the upper side of said master piston and the flow connection from the under-side of said slave piston, to cause a relatively fast work stroke travel of said ram for operation on light loads, means responsive to a predetermined increase in load on said ram during a work stroke, for shifting the under-side flow connection of said slave piston from the discharge side of said pump means, to the intake side thereof.

2. A machine in accordance with claim 1, characterized by the under-side area of said main piston being equal to the upper-side of said slave piston.

3. A machine in accordance with claim 1, characterized by said increased load responsive means as including a pressure sensing device, and means exposing said pressure sensing device to prevailing pressure in said hydraulic power system.

4. A machine in accordance with claim 2, characterized by said increased load responsive means as including a pressure sensing device, and means exposing said pressure sensing device to prevailing pressure in said hydraulic power system.

5. A machine in accordance with claim 3, characterized by said increased load responsive means as including, in addition to said pressure sensing device, a multiple valve assembly including said means for flow connecting the discharge side of said pump means, simultaneously to both the flow connection to the upper-side of said master piston and the flow connection from the under-side of said slave piston, and means responsive to said pressure sensing means for shifting said under-side flow connection of said slave piston from the discharge side of said pump means, to the intake side thereof.

References Cited

UNITED STATES PATENTS 2,100,445  11/1937  Le Bleu.
2,169,113   8/1939  Sheppard.
2,616,265  11/1952  Wilson.

EDGAR W. GEOGHEGAN, *Primary Examiner.*

U.S. Cl. X.R.

60—97